(12) United States Patent
Kumar et al.

(10) Patent No.: US 11,971,593 B2
(45) Date of Patent: Apr. 30, 2024

(54) FLEXIBLE OPTICAL FIBER RIBBON

(71) Applicant: Sterlite Technologies Limited, Gurgaon (IN)

(72) Inventors: Sravan Kumar, Aurangabad (IN); Venkatesh Murthy, Aurangabad (IN); Kishore Sahoo, Aurangabad (IN)

(73) Assignee: Sterlite Technologies Limited, Gurgaon (IN)

( * ) Notice: Subject to any disclaimer, the term of this patent is extended or adjusted under 35 U.S.C. 154(b) by 0 days.

(21) Appl. No.: 17/256,010

(22) PCT Filed: Sep. 5, 2019

(86) PCT No.: PCT/IN2019/050639
§ 371 (c)(1),
(2) Date: Dec. 24, 2020

(87) PCT Pub. No.: WO2020/049592
PCT Pub. Date: Mar. 12, 2020

(65) Prior Publication Data
US 2021/0271041 A1    Sep. 2, 2021

(30) Foreign Application Priority Data
Sep. 6, 2018    (IN) .............................. 201821033505

(51) Int. Cl.
*G02B 6/44*    (2006.01)

(52) U.S. Cl.
CPC ................................. *G02B 6/4403* (2013.01)

(58) Field of Classification Search
CPC .................................................... G02B 6/4403
USPC ......................................................... 385/114
See application file for complete search history.

(56) References Cited

U.S. PATENT DOCUMENTS

2018/0031792 A1 *   2/2018   Risch ................... G02B 6/4404

* cited by examiner

*Primary Examiner* — Jerry M Blevins
(74) *Attorney, Agent, or Firm* — Steven R. Fairchild; Michael J. Pennington

(57) ABSTRACT

The present disclosure provides an optical fibre ribbon. The optical fibre ribbon includes a plurality of optical fibres. The plurality of optical fibres is in range of about 4 to 12. In addition, each of the plurality of optical fibres is characterized by diameter. Further, the optical fibre ribbon has a pitch $d_{pitch}$. Furthermore, the optical fibre ribbon is compatible with standard 250 micron optical fibre for fusion splicing. Also, the optical fibre ribbon is characterized by planarity. Also, the optical fibre ribbon is characterized by a cured coating. Also, the cured coating has characteristic of a glass transition temperature. Also, the glass transition temperature facilitates change in state of the optical fibre ribbon from hard brittle state to soft rubbery state.

4 Claims, 4 Drawing Sheets

FLEXIBLE OPTICAL FIBER RIBBON

CROSS-REFERENCE TO RELATED APPLICATIONS

Not Applicable.

STATEMENT REGARDING FEDERALLY SPONSORED RESEARCH OR DEVELOPMENT

Not Applicable.

REFERENCE TO SEQUENCE LISTING, A TABLE, OR A COMPUTER PROGRAM LISTING COMPACT DISC APPENDIX

Not Applicable.

BACKGROUND OF THE INVENTION

Field of the Invention

The present disclosure relates to a field of optical fibre. More particularly, the present disclosure relates to a flexible optical fibre ribbon.

Description of the Related Art

Optical fiber cables have secured an important position in building a network of modern communication systems across the world. One such type of optical fiber cables are optical fiber ribbon cables. These optical fiber ribbon cables include a plurality of optical fibers ribbons. Each optical fiber ribbon includes a number of optical fibers placed adjacent and bonded together with a matrix material. Some optical fiber ribbon cables are designed for large data transmission which requires large number of optical fibers inside the optical fiber ribbon cable. These optical fiber ribbons may be held inside a buffer tube which may be covered by additional layers such as water blocking layers, armoring layer, sheathing layer and the like.

The currently available optical fiber ribbons have several drawbacks. Conventionally, the prior art optical fiber ribbons have flat surface and are arranged in vertical and horizontal manner inside the buffer tube of the optical fiber ribbon cables. This kind of arrangement inherently takes more space inside the cable. This leads to a larger diameter of the ribbon type optical fiber cable. Moreover, this leads to higher cable weight which further attracts problems during manufacturing, transporting and installation. These problems have more prominent effects in the optical fiber ribbon cables having large number of optical fibers/optical fiber ribbons.

In light of the foregoing discussion, there exists a dire need for an optical fiber ribbon which occupies less space and overcomes the above cited drawbacks of conventionally known optical fiber ribbons.

BRIEF SUMMARY OF THE INVENTION

In an aspect, the present disclosure provides an optical fibre ribbon. The optical fibre ribbon includes a plurality of optical fibres. In addition, the plurality of optical fibres is in range of about 4 to 12. Further, each of the plurality of optical fibres is characterized by a diameter. Furthermore, the diameter of each of the plurality of optical fibres is of about 210±5 micron. Moreover, two extreme optical fibres of the plurality of optical fibres has distance of about 'x' micron. Also, the optical fibre ribbon is characterized by pitch $d_{pitch}$. Also, the pitch $d_{pitch}$ is in range of about 250 micron to 255 micron. Also, the optical fibre ribbon is compatible with standard 250 micron optical fibre for fusion splicing. Also, the optical fibre ribbon is characterized by height 'h'. Also, the height 'h' of the optical fibre ribbon is in range of about 250 micron to 300 micron. Also, the optical fibre ribbon is characterized by width 'w'. Also, the width 'w' of the optical fibre ribbon is in range of about 1220 micron to 3220 micron. Also, the optical fibre ribbon is characterized by planarity. Also, the planarity of the optical fibre ribbon is in range of about 50 micron to 75 micron. Also, the optical fibre ribbon is characterized by a cured coating. Also, the cured coating has characteristic of a glass transition temperature. Also, the glass transition temperature of the optical fibre ribbon at E' onset is in range of about −18 degrees Celsius to −28 degrees Celsius corresponding to 1000 mega pascal pressure. Also, the glass transition temperature facilitates change in state of the optical fibre ribbon from hard brittle state to soft rubbery state.

A primary object of the present disclosure is to provide a flexible and a rollable optical fiber ribbon.

Another object of the present disclosure is to provide an optical fiber ribbon to use in the ribbon type optical fiber cable to reduce the overall cable diameter.

Another object of the present disclosure is to provide the optical fiber ribbon that is easy to splice.

Yet another object of the present disclosure is to provide the optical fiber ribbon has the fiber to fiber pitch $d_{pitch}$ in accordance with the standard ribbon.

Yet another object of the present disclosure is to provide the optical fiber ribbon which can be rolled and fold both forward and backward.

Yet another object of the present disclosure is to provide the optical fiber ribbon for the ribbon type optical fiber cable to reduce the overall cable weight.

In an embodiment of the present disclosure, the optical fibre ribbon includes a matrix material. In addition, the matrix material is used for imparting flexibility to the optical fibre ribbon. Further, the matrix material is a curable UV acrylate. Furthermore, the curable UV acrylate is a soft material having predefined properties.

In an embodiment of the present disclosure, the optical fibre ribbon is a corrugated optical fibre ribbon. In addition, corrugation of the optical fibre ribbon facilitates rolling of the optical fibre ribbon in a circular motion.

In an embodiment of the present disclosure, the optical fibre ribbon is used for fusion splicing. In addition, each optical fibre of the plurality of optical fibres in the optical fibre ribbon of 200 micron is compatible for fusion splicing with existing standard optical fiber ribbon of 250 micron.

In an embodiment of the present disclosure, the pitch $d_{pitch}$ is distance between the centers of any two consecutive optical fibers of the plurality of optical fibres in the optical fibre ribbon.

In an embodiment of the present disclosure, the plurality of optical fibres include 4 optical fibres. In addition, each optical fibres has width of about 1220 micrometer corresponding to 4 optical fibres.

In an embodiment of the present disclosure, the plurality of optical fibres include 6 optical fibres. In addition, each optical fibres has width of about 1648 micrometer corresponding to 6 optical fibres.

In an embodiment of the present disclosure, the plurality of optical fibres include 8 optical fibres. In addition, each optical fibres has width of about 2172 micrometer corresponding to 8 optical fibres.

In an embodiment of the present disclosure, the plurality of optical fibres include 12 optical fibres. In addition, each optical fibres has width of about 3220 micrometer corresponding to 12 optical fibres.

DESCRIPTION OF THE DRAWINGS

In order to best describe the manner in which the above-described embodiments are implemented, as well as define other advantages and features of the disclosure, a more particular description is provided below and is illustrated in the appended drawings. Understanding that these drawings depict only exemplary embodiments of the invention and are not therefore to be considered to be limiting in scope, the examples will be described and explained with additional specificity and detail through the use of the accompanying drawings in which.

Figure 1:
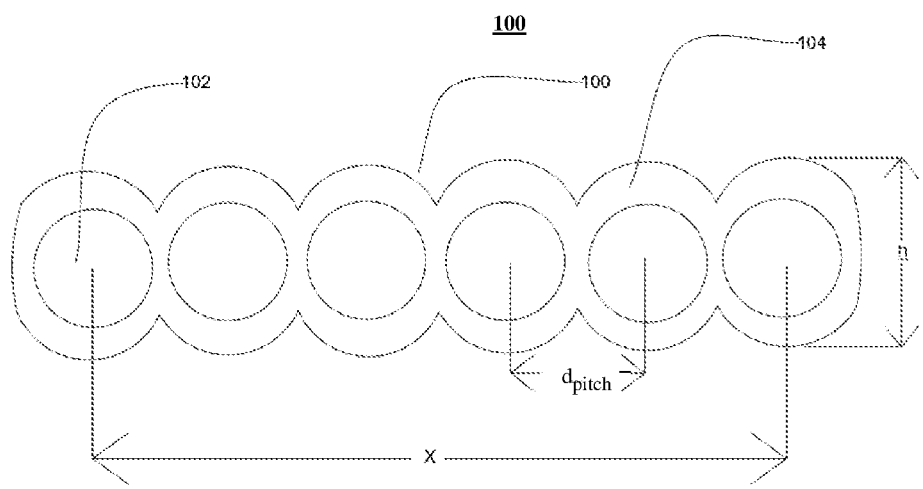
FIG. 1 illustrates a cross sectional view of an optical fiber ribbon in a normal position, in accordance with an embodiment of the present disclosure.

It should be noted that the accompanying figures are intended to present illustrations of few exemplary embodiments of the present disclosure. These figures are not intended to limit the scope of the present disclosure. It should also be noted that accompanying figures are not necessarily drawn to scale.

REFERENCE NUMERALS IN THE DRAWINGS

For a more complete understanding of the present invention parts, reference is now made to the following descriptions:

100. Optical fibre ribbon.
102. Plurality of optical fibres.
104. Matrix material.
Dpitch. Fiber to fiber pitch.
x. Distance of about x micron.
h. Height.

DETAILED DESCRIPTION OF THE INVENTION

The following detailed description is of the best currently contemplated modes of carrying out exemplary embodiments of the invention. The description is not to be taken in a limiting sense, but is made merely for the purpose of illustrating the general principles of the invention.

Reference in this specification to "one embodiment" or "an embodiment" means that a particular feature, structure, or characteristic described in connection with the embodiment is included in at least one embodiment of the present technology. The appearance of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

Reference will now be made in detail to selected embodiments of the present disclosure in conjunction with accompanying figures. The embodiments described herein are not intended to limit the scope of the disclosure, and the present disclosure should not be construed as limited to the embodiments described. This disclosure may be embodied in different forms without departing from the scope and spirit of the disclosure. It should be understood that the accompanying figures are intended and provided to illustrate embodiments of the disclosure described below and are not necessarily drawn to scale. In the drawings, like numbers refer to like elements throughout, and thicknesses and dimensions of some components may be exaggerated for providing better clarity and ease of understanding.

Moreover, although the following description contains many specifics for the purposes of illustration, anyone skilled in the art will appreciate that many variations and/or alterations to said details are within the scope of the present technology. Similarly, although many of the features of the present technology are described in terms of each other, or in conjunction with each other, one skilled in the art will appreciate that many of these features can be provided independently of other features. Accordingly, this description of the present technology is set forth without any loss of generality to, and without imposing limitations upon, the present technology.

It should be noted that the terms "first", "second", and the like, herein do not denote any order, ranking, quantity, or importance, but rather are used to distinguish one element from another. Further, the terms "a" and "an" herein do not denote a limitation of quantity, but rather denote the presence of at least one of the referenced item.

FIG. 1 illustrates a cross sectional view of an optical fibre ribbon 100, in accordance with an embodiment of the present disclosure. FIG. 1 shows an arrangement of a plurality of optical fibres 102 in the optical fibre ribbon 100. The optical fibre ribbon 100 includes the plurality of optical fibres 102, and a matrix material 104.

In an embodiment of the present disclosure, the optical fibre ribbon 100 is used in an optical fibre ribbon cable. In an embodiment of the present disclosure, the optical fibre ribbon 100 is positioned inside a buffer tube. In general, the buffer tube includes a water blocking tape to prevent the ingression of water inside the optical fiber ribbon 100. In general, the optical fibre ribbon 100 includes various optical fibres placed side by side. In addition, the optical fibre ribbon 100 includes number of optical fibres placed adjacently in a linear manner. Further, the optical fibre ribbon 100 is a series of individual optical fibers. In general, an optical fibre is a thin strand of glass or plastic capable of transmitting optical signals. In general, an optical fibre is a fibre used for transmitting information as light pulses from one end to another. In addition, the optical fibre is a thin strand of glass or plastic capable of transmitting optical signals. Moreover, the optical fibre is configured to transmit large amount of information over long distances.

The optical fibre ribbon 100 is a flexible optical fibre ribbon. The optical fibre ribbon 100 includes the matrix material 104. The matrix material 104 encloses the plurality of optical fibres 102. In addition, the matrix material 104 imparts flexibility to the optical fibre ribbon 100. The matrix material 104 is a flexible matrix material. In an embodiment of the present disclosure, the matrix material 104 is made of curable UV acrylate. In another embodiment of the present disclosure, the matrix material 104 is made of any suitable material of the like. The matrix material 104 has a pre-defined desirable flexibility. The matrix material 104 refers to a material with which the optical fibre ribbon 100 is manufactured.

The optical fibre ribbon 100 is a corrugated optical fibre ribbon. The plurality of optical fibres 102 are corrugated. In general, corrugated means to shape a material or surface into a series of parallel ridges and grooves so as to give added rigidity and strength. In an embodiment of the present disclosure, corrugation is done on both sides of the optical fibre ribbon 100 (as shown in FIG. 1).

In an embodiment of the present disclosure the plurality of optical fibres 102 in the optical fibre ribbon 100 is in range of 4 to 12. In an embodiment of the present disclosure, each optical fibre of the plurality of optical fibres 102 has diameter in range of about 210±5 micron. In an embodiment of the present disclosure, the optical fibre ribbon 100 is compatible for fusion splicing with an existing standard 250 micron fibre ribbon. In an embodiment of the present disclosure, the optical fibre ribbon 100 has a height 'h' in a range of about 0.25 millimeter and 0.3 millimeter. In an embodiment of the present disclosure, the optical fibre ribbon 100 has a fibre to fibre pitch $d_{pitch}$ of about 0.25 millimeter to 0.255 millimeter when each optical fibre of the plurality of optical fibres 102 has a diameter of about 210±5 micron.

In an embodiment of the present disclosure, the optical fibre ribbon 100 has a width 'w' in a range of about 1220 micron to 3220 micron. The optical fibre ribbon 100 is easy to roll in desired direction. In an embodiment of the present disclosure, the optical fibre ribbon 100 has a distance 'x' between extreme fibres in the optical fibre ribbon 100 in a range of about 786 micron to 2882 micron. In an embodiment of the present disclosure, the optical fibre ribbon 100 has planarity in a range of about 50 micron and 75 micron.

Figure 2:
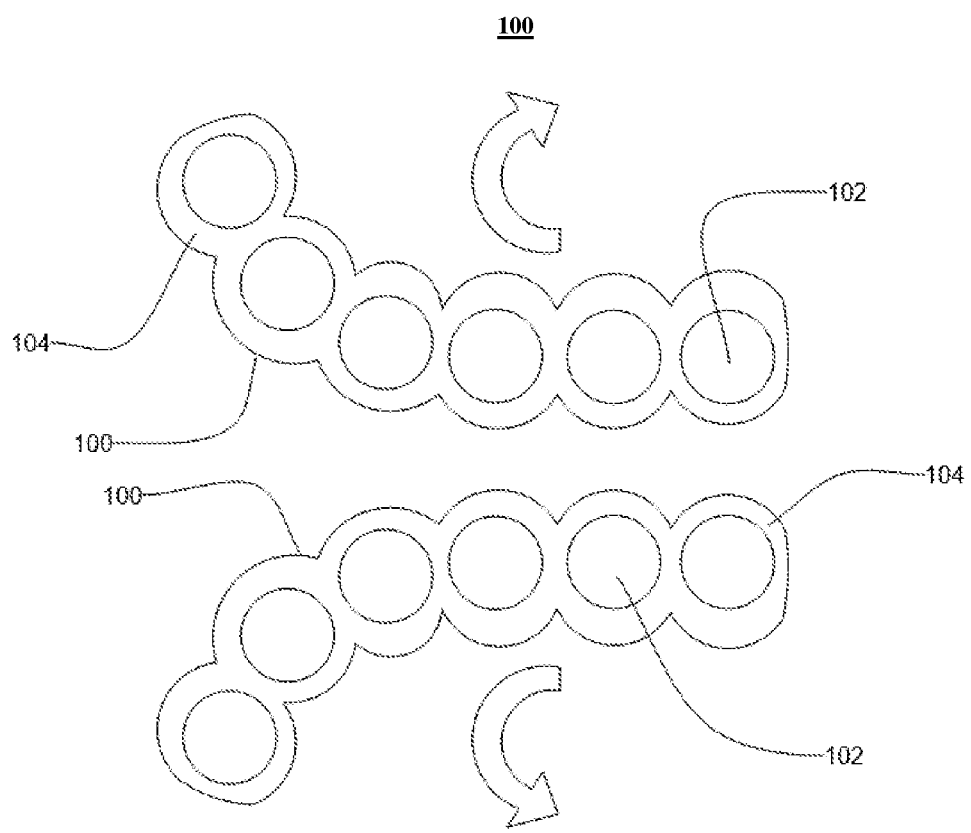
FIG. 2 illustrates a cross sectional view of FIG. 1 in a folding position, in accordance with an embodiment of the present disclosure.

FIG. 2 illustrates a cross-sectional view of the optical fibre ribbon 100 in a folding position, in accordance with an embodiment of the present disclosure. The optical fibre ribbon 100 is a rollable optical fibre ribbon. In addition, the optical fibre ribbon 100 is a corrugated optical fibre ribbon. The optical fibre ribbon 100 may be rolled in any direction. (as shown in FIG. 2)

In an embodiment of the present disclosure, the corrugation is on both sides of the optical fibre ribbon 100. In general, the corrugation is defined as grooving or folds on any surface. In addition, the corrugation enables the optical fibre ribbon 100 to roll in a circular motion. The rolling of the optical fibre ribbon 100 allows it to consume less space when positioned inside the buffer tube. In an embodiment of the present disclosure, the corrugation is on both sides of the optical fibre ribbon 100 which allows it to roll in circular motion from any of the two sides of the optical fibre ribbon 100 (as shown in the FIG. 2). In another embodiment of the present disclosure, the corrugation is done on any one side of the optical fibre ribbon 100.

Figure 3:
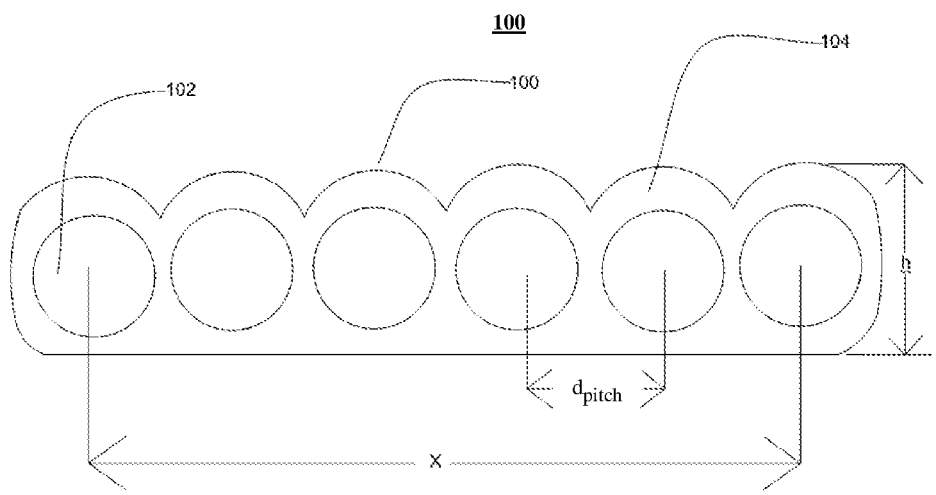
FIG. 3 illustrates a cross sectional view of an optical fiber ribbon in the normal position, in accordance with another embodiment of the present disclosure.

FIG. 3 illustrates a cross sectional view of the optical fibre ribbon 100 in a normal position, in accordance with another embodiment of the present disclosure. In another embodiment of the present disclosure, corrugation is on any one side of the optical fibre ribbon 100 and the other side of the optical fibre ribbon 100 is flat (as shown in FIG. 3).

Figure 4:
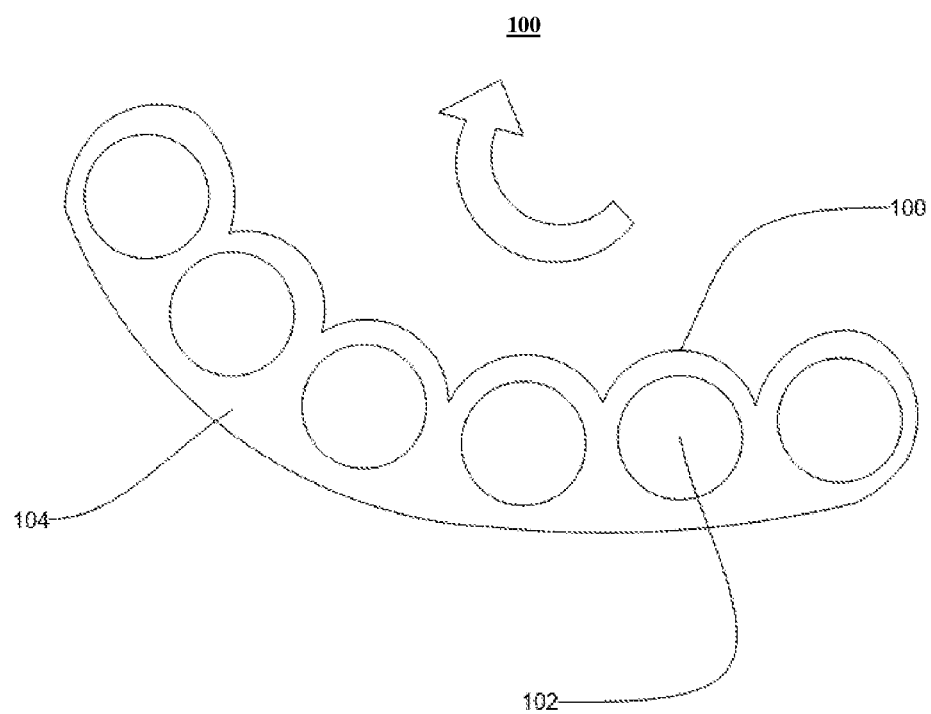
FIG. 4 illustrates a cross sectional view of FIG. 3 in the folding position, in accordance with another embodiment of the present disclosure.

FIG. 4 illustrates a cross sectional view of the optical fibre ribbon 100 in the folding position, in accordance with another embodiment of the present disclosure. In yet another embodiment of the present disclosure, the corrugation is on any one side of the optical fibre ribbon 100 and the other side is flat (as shown in FIG. 3) which allows it to roll only from the side which is corrugated (as shown in FIG. 4).

The optical fibre ribbon 100 is a flexible optical fibre ribbon made of the matrix material 104. The matrix material 104 imparts flexibility to the optical fibre ribbon 100. The flexibility of the optical fibre ribbon 100 enables it to roll easily. In addition, the flexibility is the property of the material with which the optical fibre ribbon 100 is made. In general, the flexibility may be referred to as an ability of any material that undergoes bending without any cracks or other failures when an external force is applied to it. In an embodiment of the present disclosure, the matrix material 104 is the curable UV acrylate. The curable UV acrylate is a type of material having pre-defined flexibility. The matrix material 104 facilitates flexibility to the optical fibre ribbon 100. In an embodiment of the present disclosure, the curable UV acrylate has predefined properties. In general, the curable UV acrylate is soft material having high elongation along with fast cure speed. In addition, the fast cure speed of the curable UV acrylate leads to improvement in the productivity of optical fibre ribbon. Further, the fast cure speed of the curable UV acrylate is characterized by cured film for various applications. Furthermore, the cured film exhibits excellent film stability. The optical fibre ribbon 100 has a cured coating. The cured coating has a width of about 250 micrometer. In addition, the cured coating absorbs water of about 3 percent after a time duration of about 24 hours.

In an embodiment of the present disclosure, the cured coating exhibits various mechanical properties. The mechanical properties of the cured coating includes but may not be limited to secant modulus, elongation, tensile strength, degree of cure and water absorption. The secant modulus of the cured coating is of about 2.5 percentage strain corresponding to 49 Mega Pascal pressure. In general, the secant modulus is defined as the ratio of the stress to strain at any point on curve in a stress-strain curve. The elongation of the cured coating is of about 55 percentage. In general, the elongation is defined as the ductility of a material as determined by a tension test. The tensile strength of the cured coating corresponding to 15 mega pascal pressure. In general, the tensile strength of a material is defined as the ability of a material to be stretched without breaking. The degree of cure for UV dose is of about 0.5 J/cm$^2$ corresponding to 95 percentage of ultimate secant modulus. In an embodiment of the present disclosure, the cured coating exhibits various performance characteristics. The performance characteristics of the cured coating includes but may not be limited to a glass transition temperature. In an embodiment of the present disclosure, the glass transition temperature at E' onset is of about −18 degrees Celsius corresponding to 1000 mega pascal pressure. In another embodiment of the present disclosure, the glass transition temperature at E' onset is about −28 degrees Celsius corresponding to 1000 mega pascal pressure. In yet another embodiment of the present disclosure, the glass transition temperature at E' onset corresponding to 1000 mega pascal pressure may vary. The glass transition temperature is determined by dynamic mechanical analysis. In general, dynamic mechanical analysis is a technique used to study and characterize materials. In general, the glass transition temperature ($T_g$) is the point at which a material changes its state from a hard brittle state to a soft rubbery state. In an embodiment of the present disclosure, the glass transition temperature facilitates change in state of the optical fibre ribbon 100 from hard brittle state to soft rubbery state.

In an embodiment of the present disclosure, the optical fibre ribbon 100 has a liquid coating. The liquid coating exhibits various performance characteristics. The performance characteristics of the liquid coating includes but may not be limited to viscosity and density. The liquid coating has a viscosity of about 9900 millipascal seconds at a temperature of 25 degrees Celsius. In general, the viscosity of a fluid may be defined as the fluid's internal resistance to flow. In addition, the viscosity of the fluid may be defined as the resistance of the fluid to deformation under shear stress. The liquid coating has a density of about 1110 kilograms per meter cube at a temperature of about 23 degrees Celsius. In general, the density is defined as the mass per unit volume.

The optical fibre ribbon 100 has ability of a mass fusion splicing. In an embodiment of the present disclosure, the optical fibre ribbon 100 is spliced with the mass fusion splicing. In general, the mass fusion splicing is a phenomenon that fuses all fibers in one ribbon at once. In addition, the mass fusion splicing splices entire ribbons simultaneously. In general, fusion splicing is the phenomenon of joining ends of the two optical fibres using heat. In addition, the joint should be made in such a way as to prevent the scattering of light from the splice when the light travels through the optical fibre. In general, the process of fusion splicing mainly involves the use of heat to melt the ends of the optical fibre for joining or fusion together. In addition, the process majorly involves various steps. Further, the step includes stripping of the fibre, cleaning of the fibre, cleaving of the fibre followed with splicing of the fibre.

The optical fibre ribbon 100 includes the plurality of optical fibres 102. In an embodiment of the present disclosure, number of optical fibres in the plurality of optical fibres 102 in the optical fibre ribbon 100 is 4. In another embodiment of the present disclosure, number of optical fibres in the plurality of optical fibres 102 in the optical fibre ribbon 100 is 6. In yet another embodiment of the present disclosure, number of optical fibres in the plurality of the optical fibres in the optical fibre ribbon 100 is 8. In yet another embodiment of the present disclosure, number of optical fibres in the plurality of optical fibres 102 in the optical fibre ribbon 100 is 12. In yet another embodiment of the present disclosure, number of optical fibres in the plurality of optical fibres 102 in the optical fibre ribbon 100 may vary.

In an embodiment of the present disclosure, each optical fibre of the plurality of optical fibres 102 in the optical fibre ribbon 100 has diameter of about 210±5 micron. In another embodiment of the present disclosure, each optical fibre of the plurality of optical fibres 102 in the optical fibre ribbon 100 has diameter of about 205 microns. In yet another embodiment of the present disclosure, each optical fibre of the plurality of optical fibres 102 in the optical fiber ribbon 100 has diameter of about 215 microns. In yet another embodiment of the present disclosure, diameter of each optical fibre of the plurality of optical fibres 102 in the optical fiber ribbon 100 may vary.

Also, each optical fibre of the plurality of optical fibres 102 in the optical fibre ribbon 100 of 200 micron is compatible for fusion splicing with existing standard optical fiber ribbon of 250 micron. Also, each optical fibre of the plurality of optical fibres 102 in the optical fibre ribbon 100 of any suitable diameter is compatible for fusion splicing with existing standard optical fiber ribbon of 250 micron.

In an embodiment of the present disclosure, the plurality of optical fibres 102 has the fiber to fiber pitch $d_{pitch}$ of about 0.25 millimeters corresponding to plurality of optical fibres 102 having diameter of about 210±5 microns. In another embodiment of the present disclosure, the plurality of optical fibres 102 has fiber to fiber pitch $d_{pitch}$ of about 0.255 millimeters corresponding to the plurality of optical fibres 102 having diameter of about 210±5 microns. In addition, the fiber to fiber pitch is defined as the distance between the centers of any two consecutive optical fibers in the optical fiber ribbon 100. The spacing between the two consecutive optical fibers in the optical fibre ribbon 100 are filled with the UV curable acrylate material. In an embodiment of the present disclosure, the plurality of optical fibres 102 has the fiber to fiber pitch $d_{pitch}$ in range of about 250 micron to 255 micron corresponding to the plurality of optical fibres 102 having diameter of about 210±5 microns.

In an embodiment of the present disclosure, the optical fibre ribbon 100 is characterized by the height 'h' in range of about 0.25 millimeters to 0.3 millimeters. In another embodiment of the present disclosure, the height 'h' of the optical fibre ribbon 100 may vary. In addition, the height 'h' of the optical fibre ribbon 100 is measured as a perpendicular distance between two tangents. The two tangents drawn at lowest most and upper most point in the optical fibre ribbon 100. In an embodiment of the present disclosure, the optical fibre ribbon 100 has a predefined height 'h' based on the requirement.

In an embodiment of the present disclosure distance 'x' between two extreme optical fibers of the plurality of optical fibres 102 is measured. The distance between the two extreme optical fibers of the plurality of optical fibres 102 in the optical fiber ribbon 100 is defined as extreme fiber distance 'x' (as shown in FIG. 1 and FIG. 3). In an embodiment of the present disclosure, the planarity of the optical fiber ribbon is measured. In general, the planarity is defined as the normal distance between the extreme upper and extreme lower optical fibers within the optical-fiber ribbon.

In an embodiment of the present disclosure, the optical fibre ribbon 100 includes 4 optical fibres. In an embodiment of the present disclosure, the optical fibre ribbon 100 has the width 'w' of about 1220 micrometer. In another embodiment of the present disclosure the width 'w' of the optical fibre ribbon 100 may vary. In an embodiment of the present disclosure, the optical fibre ribbon 100 has the height 'h' of about 360 micrometer. In another embodiment of the present disclosure the height 'h' of the optical fibre ribbon 100 may vary. In an embodiment of the present disclosure, distance 'x' between the two extreme optical fibers of the plurality of optical fibres 102 in the optical fiber ribbon 100 is about 786 micrometer. In another embodiment of the present disclosure, distance 'x' between the two extreme optical fibers of the plurality of optical fibres 102 in the optical fiber ribbon 100 may vary. In an embodiment of the present disclosure, the optical fibre ribbon 100 has the planarity of about 50 micron. In another embodiment of the present disclosure, the planarity of the optical fibre ribbon 100 may vary.

In another embodiment of the present disclosure, the optical fibre ribbon 100 includes 6 optical fibers. In an embodiment of the present disclosure, the optical fiber ribbon 100 has the width 'w' of about 1648 micrometer. In another embodiment of the present disclosure, the width 'w' of the optical fiber ribbon 100 may vary. In an embodiment of the present disclosure, the optical fibre ribbon 100 has the height 'h' of about 360 micrometer. In another embodiment of the present disclosure, the height 'h' of the optical fibre ribbon 100 may vary. In an embodiment of the present disclosure, the distance 'x' between the two extreme optical fibers of the plurality of optical fibre 102 in the optical fibre ribbon 100 is about 1310 micrometer. In another embodiment of the present disclosure, distance 'x' between the two extreme optical fibers of the plurality of optical fibres 102 in the optical fiber ribbon 100 may vary. In an embodiment of the present disclosure, the optical fibre ribbon 100 has planarity of about 50 micron. In another embodiment of the present disclosure, planarity of the optical fibre ribbon 100 may vary.

In yet another embodiment of the present disclosure, the optical fibre ribbon 100 includes 8 optical fibers. The optical fiber ribbon 100 has the width 'w' of about 2172 micrometer. In another embodiment of the present disclosure, the width w of the optical fibre ribbon 100 may vary. In an embodiment of the present disclosure, the optical fiber ribbon 100 has the height 'h' of about 360 micrometer. In another embodiment of the present disclosure, height 'h' of the optical fibre ribbon 100 may vary. In an embodiment of the present disclosure, distance 'x' between two extreme optical fibers in the optical fiber ribbon 100 is about 1834 micrometer. In another embodiment of the present disclosure, distance 'x' between the two extreme optical fibers of the plurality of optical fibres 102 in the optical fiber ribbon 100 may vary. In an embodiment of the present disclosure, the optical fiber ribbon 100 has planarity of about 50 micron. In another embodiment of the present disclosure, planarity of the optical fibre ribbon 100 may vary.

In yet another embodiment of the present disclosure, the optical fibre ribbon 100 includes 12 optical fibres. In an embodiment of the present disclosure, the optical fiber ribbon 100 has the width 'w' of about 3220 micrometer. In another embodiment of the present disclosure, the width 'w' of the optical fibre ribbon 100 may vary. In an embodiment of the present disclosure, the optical fiber ribbon 100 has the height 'h' of about 360 micrometer. In another embodiment of the present disclosure, the height 'h' of the optical fibre ribbon 100 may vary. In an embodiment of the present disclosure, distance 'x' between two extreme optical fibers in the optical fiber ribbon 100 is about 2882 micrometer. In another embodiment of the present disclosure, distance 'x' between the two extreme optical fibers of the plurality of optical fibres 102 in the optical fiber ribbon 100 may vary. In an embodiment of the present disclosure, the optical fiber ribbon 100 has the planarity of about 75 micron. In another embodiment of the present disclosure, planarity of the optical fibre ribbon 100 may vary.

The present disclosure provides numerous advantages over the prior art. The present disclosure provides the optical fiber ribbon for mass fusion splicing with reduction in optical fiber ribbon dimensions. In addition, each optical fibre of the plurality of optical fibres in the optical fiber ribbon of 200 micron is compatible for fusion splicing with existing standard optical fiber ribbon of 250 micron. Further, the optical fiber ribbon as disclosed above is rolled into a circular motion that reduces overall optical fibre cable diameter.

The foregoing descriptions of specific embodiments of the present technology have been presented for purposes of illustration and description. They are not intended to be exhaustive or to limit the present technology to the precise forms disclosed, and obviously many modifications and variations are possible in light of the above teaching. The embodiments were chosen and described in order to best explain the principles of the present technology and its practical application, to thereby enable others skilled in the art to best utilize the present technology and various embodiments with various modifications as are suited to the particular use contemplated. It is understood that various omissions and substitutions of equivalents are contemplated as circumstance may suggest or render expedient, but such are intended to cover the application or implementation without departing from the spirit or scope of the claims of the present technology.

Although the present disclosure has been explained in relation to its preferred embodiment(s) as mentioned above, it is to be understood that many other possible modifications and variations can be made without departing from the spirit and scope of the inventive aspects of the present invention. It is, therefore, contemplated that the appended claim or claims will cover such modifications and variations that fall within the true scope of the invention.

What is claimed is:

1. An optical fibre ribbon comprising:
   a plurality of optical fibres, wherein adjacent optical fibers of the plurality of optical fibres are fully or partially connected along length, wherein the planarity of the optical fibre ribbon is in a range of 50 micron to 75 micron; wherein pitch cloth in a range of 250 micron to 255 micron, wherein diameter of each of the plurality of optical fibres is less than 250 microns;
   wherein the optical fibre ribbon is a corrugated shaped optical fibre ribbon, wherein the corrugation of the optical fibre ribbon facilitates rolling of the optical fibre ribbon, wherein the optical fibre ribbon has a cured coating, wherein the cured coating has characteristic of a glass transition temperature, wherein the glass transition temperature of the optical fibre ribbon at E' onset is in a range of −18 degrees Celsius to −28 degrees Celsius corresponding to 1000 mega pascal pressure, wherein the glass transition temperature facilitates change in state of the optical fibre ribbon from hard brittle state to soft rubbery state, wherein the cured coating absorbs water of 3 percent after a time duration of 24 hours.

2. The optical fibre ribbon as claimed in claim 1, wherein the optical fibre ribbon has at least one of height h in a range of 250 micron to 300 micron, width w in a range of 1220 micron to 3220 micron, and diameter of each of the plurality of optical fibres is 200±10.

3. The optical fibre ribbon as claimed in claim 1, wherein the optical fibre ribbon comprises a matrix material (104), wherein the matrix material (104) is a curable UV acrylate.

4. The optical fibre ribbon as claimed in claim 1, wherein each optical fibre ribbon has the width of 1220 micrometer when the optical fibre ribbon has 4 optical fibres, wherein each optical fibres has the width of 1648 micrometer when the optical fibre ribbon has 6 optical fibres, wherein each optical fibres has the width of 2172 micrometer when the optical fibre ribbon has 8 optical fibres, wherein each optical fibres has the width of 3220 micrometer when the optical fibre ribbon has 12 optical fibres.

\* \* \* \* \*